Patented Dec. 26, 1950

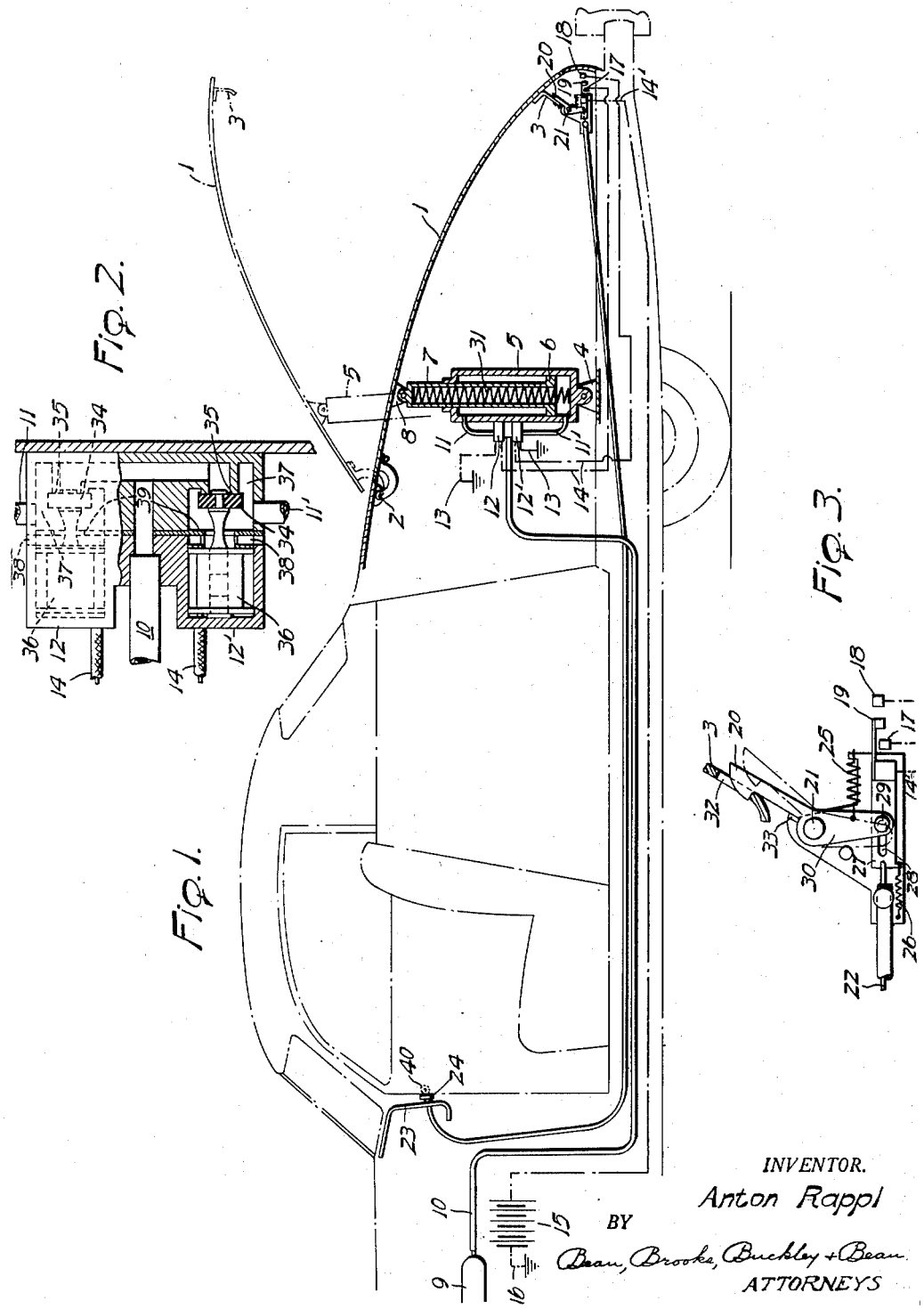

2,535,600

UNITED STATES PATENT OFFICE 2,535,600

MOTOR VEHICLE LUGGAGE COMPARTMENT CLOSURE OPERATING MECHANISM

Anton Rappl, Eggertsville, N. Y., assignor to Trico Products Corporation, Buffalo, N. Y.

Application June 14, 1947, Serial No. 754,671

2 Claims. (Cl. 268—75)

This invention relates to a motor vehicle body construction and primarily to an operator for one of the closures to its several compartments. Especially the invention is designed for the opening and closing of the vehicle trunk, and the primary object of the invention is to provide an improved mechanism by which ready access to the trunk compartment may be authorized from the driver's seat.

Again the invention has for its object to provide a vehicle compartment in which the closure is secured closed in a practical manner and is mounted and arranged for easy and safe movement to and from a closed position. Further, the invention has for its object to provide a closure operator which is of simple construction and compact size toward facilitating its installation on the vehicle.

The foregoing and other objects will manifest themselves as the following description progresses, reference being had to the accompanying drawing, wherein:

Fig. 1 shows a rather diagrammatic lay-out of the invention as incorporated in a motor vehicle;

Fig. 2 is a detail depicting the control unit partly in section; and

Fig. 3 is a detail of the trunk lock.

Referring more particularly to the drawings, the numeral 1 designates the trunk closure or cover hinged at 2 and provided with a lock keeper 3 along its free edge.

Arranged within the trunk compartment is a motor pivotally mounted on a bracket 4. The motor illustrated is of the fluid pressure type and it comprises a chamber 5 and a piston 6 slidable therein, the piston rod 7 extending through one end of the chamber for pivotal connection to the cover carried bracket 8. Preferably, two motors are provided, one on each side of the trunk compartment. A suitable source of operating pressure, such as the intake manifold 9 of the vehicle engine which will provide a suction or negative pressure influence, is connected to the chamber 5 at opposite sides of the piston 6 by means of a suction line 10 and branch passages 11 and 11'. Interposed in each branch passage is an electromagnetic valve 12 (12') which may be of any approved design and normally vent the opposite ends of the motor chamber to the atmosphere, each electromagnet having a ground connection 13 and a circuit wire 14 leading through a common wire 14' to a source of electrical energy such as the battery 15. The battery ground connection is indicated at 16 and completes the circuit for energizing the electromagnetic valves 12, 12' for opening the branch passages 11, 11' to the pressure supply conduit 10.

The electromagnetic valves are selectively operable by means of a switch comprising the stationary contacts 17 and 18, connected respectively to the two electromagnetic valves by the wires 14, and a movable contact 19 connected by the wire 14' to a battery 15. By manipulating the switch contact 19 to selectively engage either fixed contact 17 or 18, the fluid motor may be energized to correspondingly adjust the trunk cover 1. If the branch passage 11 is opened to the source of operating pressure, the pressure differential acting on the piston 6 will lift the closure to the broken line position. On the other hand, should the branch passage 11' be opened to the source of suction by actuating the valve 12', the piston will be retracted to close the trunk.

When the cover is in its closed position, the lock keeper 3 will be engaged by a latch 20 which is movably mounted, as on a pivot 21, and is operable by a flexible wire 22, or the equivalent, from a remote point which is readily accessible to the motorist. In the illustrated embodiment, the flexible actuator is carried up to the instrument panel 23 and is provided with a knob 24 which is normally held in a neutral position by any suitable means, such as the latch spring 25 acting in one direction and a second spring 26 acting in the opposite direction. The flexible actuator 22 embodies a sliding bar 27 which has a slot 28 receiving a guide pin 29 on the latch arm 30 thereby providing a play connection which will permit the actuator moving the contact 19 into engagement with the trunk lowering contact 18 without disturbing the normally positioned latch.

In operation, a pull exerted on the knob 24 will disengage the latch 20 from its keeper 3 and thereafter bring the contact 19 into circuit closing engagement with the trunk opening contact 17 to open the source of suction to the upper side of the piston 6. The resulting pressure differential will thereupon move the piston upwardly to lift the unlocked cover 1 to the broken line position shown in Fig. 1. Upon release of the knob 24 the spring 25 will separate the contacts 17 and 19, and the trunk cover will be sustained in its elevated position by means of a counterbalance spring 31.

When it is desired to close the trunk, the knob 24 will be pushed inwardly from its neutral position to bring contact 19 into circuit closing engagement with contact 18 whereupon a reverse pressure differential will retract the piston and bring the trunk down to its closed position. As it approaches its lowermost position, the keeper 3 will depress the latch nose 20 until the keeper recess 32 is brought opposite the nose, whereupon the latch will interlock with the keeper to securely fasten the trunk cover in its closed position. A stop 33 supports the latch in a keeper engaging position while the slide 27 continues to move by reason of the play connection 28, 29 for closing the circuit through the contacts 18 and 19. When the knob is released the tension spring 26 will restore the slide 27 and its supported contact 19 to the neutral position depicted in Fig. 3.

The counterbalance spring 31 is of the coil type and is housed within the piston rod 7 which is formed tubular for that purpose. The upper end of the spring finds support on the inner end wall of the axial bore in the piston rod, while the opposite end of the spring finds opposed support in the bottom of the chamber 5. Not only is the spring housed and concealed within the motor for compactness and ease of installation, but the relatively long spring will provide a more uniform counterbalancing action on the trunk cover since the compression of the spring is such as to maintain the counterbalance effective more nearly in the zone of maximum elasticity.

While any type of electromagnetic valve may be employed, there is herein shown a control unit in Fig. 2 wherein the valve 34 is normally engaged with the seat 35 to interrupt the communication between the branch conduit and the suction line 10. At this time the branch conduit is vented through the chamber 37 and the atmospheric port 38. When the magnet 36 is energized the valve 34 will be lifted from its seat 35 and engaged over a seat 39 to open the suction communication and close the atmospheric port for effecting the selected operation of the trunk closure.

The knob 24 may be locked against manipulation by a key 40, if desired, suitable lock mechanism being incorporated in the knob for that purpose. The arrangement is practical and enables the motorist to open his trunk for inspection purposes without him leaving his seat. When opened, the trunk cover is counterbalanced in any position of adjustment by the motor concealed spring. Likewise, the lock is enclosed within the trunk so as to leave a neat exterior finish, and while the foregoing description has been given in detail for clearness and without thought of limitation, the inventive principles involved are capable of assuming other physical embodiments without departing from the spirit of the invention and the scope of the appended claims. Furthermore, the use of the operator is not confined to the trunk compartment of a vehicle since it may readily be adapted for the operation of the closures of other compartments found in the vehicle, and therefore the use of the term "trunk" herein is employed in a comprehensive manner to include such other compartments.

What is claimed is:

1. A motor vehicle luggage compartment provided with an upwardly swinging closure, a pneumatic motor comprising a chamber and a piston operable therein, one of the motor elements being pivotally connected to a fixed part of the luggage compartment and the other motor element being pivotally connected to said closure, with a spring interposed between the piston and chamber elements for being compressed therebetween by and upon movement of the closure to its closed position whereby to provide a cushioned support for the closure when otherwise free, means for locking the closure in its closed position, and means for operatively admitting fluid under pressure to the motor for lifting the closure when the latter is unlocked.

2. A motor vehicle luggage compartment provided with an upwardly swinging closure, a pneumatic motor comprising a chamber and a piston operable therein, one of the motor elements being pivotally connected to a fixed part of the luggage compartment and the other motor element being pivotally connected to said closure, with a spring interposed between the piston and chamber elements for being compressed therebetween by and upon movement of the closure to its closed position whereby to provide a cushioned support for the closure when otherwise free, means for locking the closure in its closed position, means for operatively admitting fluid under pressure to the motor for lifting the closure when the latter is unlocked, and means accessible from within the vehicle and manually operable to positively unlock the closure and thereafter to render said fluid admitting means operative.

ANTON RAPPL.

REFERENCES CITED

The following references are of record in the file of this patent:

UNITED STATES PATENTS

| Number | Name | Date |
|---|---|---|
| 377,858 | Lawrence | Feb. 14, 1888 |
| 1,880,135 | Heath | Sept. 27, 1932 |
| 2,113,291 | Clark et al. | Apr. 5, 1938 |
| 2,128,849 | Redfern | Aug. 30, 1938 |
| 2,218,683 | Miller | Oct. 22, 1940 |
| 2,272,732 | Vander Veer | Feb. 10, 1942 |
| 2,352,929 | Worgess | July 4, 1944 |

FOREIGN PATENTS

| Number | Country | Date |
|---|---|---|
| 812,199 | France | Jan. 27, 1937 |